United States Patent
Goller

(10) Patent No.: US 6,402,922 B1
(45) Date of Patent: Jun. 11, 2002

(54) PULSE PLATING

(75) Inventor: Johannes Goller, Grödig (AT)

(73) Assignee: Sony Dadc Austria AG, Anif (AT)

( * ) Notice: Subject to any disclaimer, the term of this patent is extended or adjusted under 35 U.S.C. 154(b) by 0 days.

(21) Appl. No.: 09/526,870

(22) Filed: Mar. 16, 2000

(30) Foreign Application Priority Data

Mar. 17, 1999 (AT) .............................................. 479/99

(51) Int. Cl.[7] .............................. C25D 1/10; C25D 1/00
(52) U.S. Cl. ......................................... 205/70; 205/67
(58) Field of Search .............................. 205/67, 68, 69, 205/70

(56) References Cited

U.S. PATENT DOCUMENTS 4,119,501 A  10/1978  Fisher et al. .................. 204/49

FOREIGN PATENT DOCUMENTS

DE  42 21 970  1/1994
WO  97/00980  1/1997

OTHER PUBLICATIONS

Patent Abstract of Japan JP 4099192A (Mar. 31, 1992).
Patent Abstract of Japan JP 10060680A (Mar. 03, 1998).
Patent Abstract of Japan JP 55014869A (Feb. 01, 1980).
Patent Abstract of Japan, vol. 008, No. 199, Sep. 12, 1984 & JP 59 089782 A, May 24, 1984.
Database WPI, Section Ch, Week 7810, Mar. 1978, Derwent Publications Ltd., London, Great Britain; & JP 53 007546, Jan. 24, 1978 (abstract).

*Primary Examiner*—Donald R. Valentine
*Assistant Examiner*—Erica Smith-Hicks
(74) *Attorney, Agent, or Firm*—Frommer Lawrence & Haug LLP; William S. Frommer; Dennis M. Smid

(57) ABSTRACT

A method for the electrolytic production of injection moulding moulds (6) made of nickel for the production of CDs with the nickel, preferably in the form of pellets (2), being switched as anode and a workpiece (3), forming the counterpart to the injection moulding mould to be produced, being switched as cathode and both the nickel as well as the workpiece being held in an electrolytic solution (1) which has been added with a combination of halogens. In order to accelerate the electrolytic production of nickel workpieces, and nickel moulds in particular, without destroying the electrolytic solution and without any reduction in quality of the nickel mould which would prevent its further use, it is provided that a pulsating direct current or alternating current is applied to the anode and cathode and the combination of the halogens comprises 3% to 7% (per cent by weight) of fluorine, 60% to 70% (per cent by weight) of chlorine, 20% to 25% (per cent by weight) of bromine and 5% to 10% (per cent by weight) of iodine.

6 Claims, 1 Drawing Sheet

PULSE PLATING

The present invention relates to a method for the electrolytic production of injection moulding moulds made of nickel in accordance with the preamble of claim 1.

Such methods are employed, among other things, for the electrolytic production of items made of metal which are difficult to produce according to other methods. In the production of optical media such as Compact Discs for example, the production of the individual CDs that are obtainable on the market is performed by using the injection moulding method. As is well known, an injection moulding mould is required for this purpose, with a so-called "master" being produced in a first working cycle which actually represents the only true original. In further working cycles a so-called "mother" is produced which on its part represents the precise counterpart of the "master". It is used to produced so-called "stampers" which are then used as the actual injection moulding moulds.

In order to produce these injection moulding moulds a glass plate is produced at first which comprises the data embossed in form of recesses or elevations on one of its sides on the surface which are produced by the application of photosensitive resist, with said surface characterized by the recesses and elevations having a shape representing the precise counterpart to the injection moulding mould to be produced. Said glass plate is now used as the workpiece and is connected in the next working cycle (within the galvanotechnical process) as a cathode and the metal from which the actual product is to be made, which in the present case is nickel, is connected as an anode. Both the metal as well as the workpiece are held in this process in an electrolytic solution which substantially consists of distilled water, boric acid and nickel sulphamate. After the application of a DC voltage the metal, which may be present in the form of so-called nickel pellets, dissolves in the solution and travels in the direction towards the cathode, which means towards the workpiece, on the surface of which it deposits. Following the severing of the metal coating from the glass plate, the "master" has thus been produced. With the help of said "master", which is now used instead of the glass plate, the production of the "mother" occurs in an analogous manner. The production of the "stamper", which constitutes the replacement of the "master" by the "mother", also occurs analogously. A stamper is thus also identical with the master and is now used as an injection moulding mould for producing the CDs.

The depositing speed of the nickel on the workpiece (master, mother) depends on the applied voltage, i.e. on the current intensity or density. In order to accelerate the production process it would be necessary to keep the current density as high as possible. The mean current density is approx. 2.5 A/dm2 in conventional methods.

The current which is currently used in practical operation concerns constant direct current. Problems will occur, however, in increasing the current strength which will have a negative influence on the quality of the deposit, i.e. the injection moulding mould, to such an extent that further use of the mould in the further production process is not possible. Thus, an increase of the current and thus the current density will cause an uneven nickel deposition on the workpiece, with the formation of local voltage peaks on the surface of the workpiece, thus preventing the obtained mould from achieving the required shape and even density. In the production of CDs, however, the adherence to very narrow tolerances is particularly important, since the laser which scans the stored data requires a precisely set distance to the CD in order to operate correctly. If the CD now has a varying thickness due to an imprecise irregular injection moulding mould, the distance between the laser and the CD surface will vary and read errors can occur. Moreover, the uneven distribution of material in CDs will cause balance errors which cannot be neglected and constitute a big problem in the use of modern CD-drives which, as is well known, have very high speeds of rotation. The uneven nickel deposition on the workpiece further leads to internal tensions in the mould, thus finally making the entire mould oblique and thus useless for the further production process. Another big problem in increasing the DC strength is the occurrence of so-called "rough back" unevenness. This is understood as being uneven locations which occur on the surface of the mould that does not bear any data. Local current peaks will lead to increased deposits of nickel at certain locations, thus leading to elevations in the surface there, which again contribute to the formation of voltage peaks. This loop leads to the consequence that nickel deposits occur in form of hills or tips on the reverse side of the mould. As a result of the high pressure with which the molten material is pressed onto the mould in the injection moulding machine, these uneven locations push through the mould and damage the workpiece to be produced, namely the CDs that can be purchased.

In order to avoid these problems it was tried to use a known method, the so-called pulse-plating method, for producing such moulds. The pulse-plating method is already used in practical operation for the galvanotechnical production of metal objects. A pulsating direct current of various pulse forms (rectangle, sine, triangle) is used. It can also occur that the direction of current is reversed briefly, as a result of which "bulged" deposits of material which are accumulated by local voltage peaks can be removed again. In this way it is possible to effectively prevent the formation of the "rough back" unevenness and the mould to be produced is provided with a very homogeneous metal structure. In order to obtain the same depositing rate of nickel at the cathode by using the pulse-plating method for the production of nickel moulds as in the pure DC method, it is necessary to increase the mean density of current and thus also the peak current density as compared with the pure DC method in order to at least obtain or increase the net material transport. The increase of the peak current density for the application of the pulse-plating method was only possible up until now in the case of very stable electrochemical solutions (such as Cr). In the case of nickel solutions it is not possible to exceed a density of current of 2.5 A/dm$^2$ as the nickel solution will otherwise begin to degrade. Moreover, the anode solubility (the nickel solubility) is too low at high strengths of current and the pH-value drops below 3.8, as a result of which the solution begins to degrade and becomes useless as electrolyte.

From JP 10060680 A it is known to add halogen ions to the electrolytic solution. A relevant increase of the current density is not possible with this method.

It is the object of the present invention to accelerate the electrolytic production of nickel workpieces, and nickel moulds in particular, without destroying the electrolytic solution and without any reduction in quality of the nickel mould which would prevent its further use.

As a result of the special concentration of the additives, the electrolytic solution will also remain stable at high mean densities of current, the pH-value will remain constant and the net material transport during the pulse-plating method can be at least maintained in comparison with pure DC methods with constant strength or density of current, and can also be increased with a respective increase of the mean density of current. Furthermore, the solubility of the nickel pellets is increased, thus reducing the time required for the entire production process.

A pulsating direct current or alternating current chosen in such a way that a mean density of current of between 40 ampere/dm$^2$ and 120 ampere/dm$^2$, preferably 50 ampere/dm$^2$, is formed substantially helps to reduce the duration of the coating process (by a factor of 7) as compared with conventional methods.

The claims 2 to 5 describe preferable embodiments of the method.

DETAILED DESCRIPTION OF DRAWINGS

Figure 1:
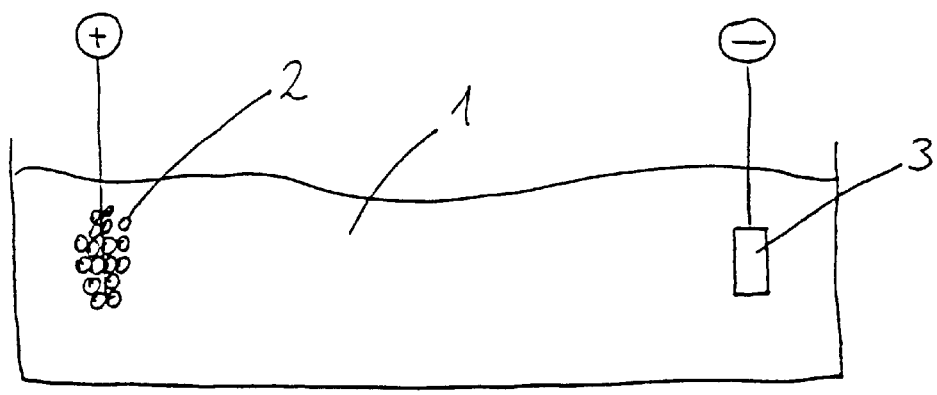
FIG. 1 shows a schematic arrangement of an apparatus for performing the method in accordance with the invention.
Figure 2:
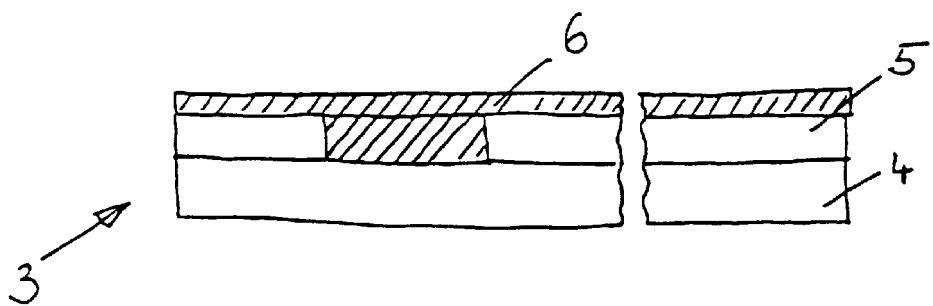
FIG. 2 shows the workpiece switched as a cathode, including the nickel deposits.

In FIG. 1, a workpiece 3 and nickel in form of pellets 2 are held in an electrolytic solution 1 which substantially consists of distilled water, boric acid and nickel sulphamate. The workpiece 3 is switched as a cathode, whereas the nickel pellets 2 are switched as anode. After the application of a voltage the nickel pellets go into solution and begin to deposit on workpiece 3. In the event of the production of a master (see FIG. 2), the workpiece 3 consists of a glass substrate 4 on whose surface the data are applied in form of elevations by means of photosensitive resist 5. The nickel workpiece 6 (master) which can be produced by means of galvanotechnical methods is produced by the depositing of the dissolved nickel on the workpiece 3 or on the photosensitive resist 5, respectively. When a mother is produced the master is used instead of the glass substrate 4. When a stamper is produced a mother is used instead of the glass substrate. Master and stamper are thus geometrically identical.

As a result of the addition of the combination of halogens to the electrolytic solution in accordance with the invention, the density of current can now be raised in the galvanotechnical method, thus increasing the depositing rate of the nickel and reducing the production time without impairing the quality of the coating and without making the electrolytic solution unstable. In this way it is possible to enable an increase of the mean current density to between 40 Ampere/dm$^2$ and 120 Ampere/dm$^2$, preferably to 50 Ampere/dm$^2$. The voltage thus applied in this process can be increased from 16 V to 30 V. The entire time for the production of a mould decreases from 70 minutes to 10 minutes.

The solubility of the Ni pellets also increases. This is the prerequisite for the meaningful application of the pulseting plating method, since in this method it is necessary to strongly increase the peak current densities, and thus also the mean density of current, as compared with the DC method in order to reduce the time of deposit as compared with previously employed methods.

What is claimed is:

1. A method for electrolytic production of injection moulding moulds made of nickel for the production of CDs, with the nickel, being assigned as an anode and a workpiece, forming the counterpart to the injection moulding mould to be produced, being assigned as a cathode and both the nickel as well as the workpiece being held in an electrolytic solution which has been added a combination of halogens, characterized in that a pulsating direct current or alternating current is applied to the anode and cathode and the combination of the halogens comprises 3% to 7% of fluorine, 60% to 70% of chlorine, 20% to 25% of bromine and 5% to 10% of iodine.

2. A method as claimed in claim 1, characterized in that a pulsating direct current or alternating current is chosen in such a way that a mean density of current between 40 Ampere/dm$^2$ and 120 Ampere/dm$^2$ is formed.

3. A method as claimed in claim 1, characterized in that the electrolytic solution substantially contains distilled water, boric acid and nickel sulphamate.

4. A method as claimed in claim 1, characterized in that the quantity of boric acid per litrer of distilled water is not more than 45 g.

5. A method as claimed in claim 1, characterized in that the quantity of nickel sulphamate per litrer of distilled water is 1.36 g.

6. A method as claimed in claim 1, wherein the nickel is in the form of pellets.

* * * * *